(12) United States Patent
He et al.

(10) Patent No.: US 9,648,709 B2
(45) Date of Patent: May 9, 2017

(54) FAULT DETECTION DEVICE FOR STREETLAMP LIGHTING SYSTEM AND METHOD OF OPERATING THE SAME

(71) Applicant: OSRAM GmbH, Munich (DE)

(72) Inventors: Zhongyi He, Shanghai (CN); Norbert Linder, Lappersdorf (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/909,148

(22) PCT Filed: Jul. 25, 2014

(86) PCT No.: PCT/EP2014/066085
§ 371 (c)(1),
(2) Date: Feb. 1, 2016

(87) PCT Pub. No.: WO2015/014755
PCT Pub. Date: Feb. 5, 2015

(65) Prior Publication Data
US 2016/0183354 A1    Jun. 23, 2016

(30) Foreign Application Priority Data
Aug. 1, 2013 (CN) .......................... 2013 1 0332023

(51) Int. Cl.
*H05B 37/02* (2006.01)
*H05B 37/03* (2006.01)
(Continued)

(52) U.S. Cl.
CPC ....... *H05B 37/034* (2013.01); *H05B 37/0218* (2013.01); *H05B 37/0263* (2013.01); *Y02B 20/72* (2013.01)

(58) Field of Classification Search
CPC .. H05B 37/00; H05B 37/0227; H05B 33/089; H05B 37/02; H05B 37/0245;
(Continued)

(56) References Cited

U.S. PATENT DOCUMENTS 5,095,502 A    3/1992   Finzel
5,479,159 A * 12/1995  Kelly ................. H02J 13/0089
                                                        315/119
(Continued)

FOREIGN PATENT DOCUMENTS

EP        1672810 A1    6/2006

OTHER PUBLICATIONS

Title: EP1672810 (A1) Power supply control device for electric devices, in particular lamps for public lighting, Date: Jun. 21, 2006.*
(Continued)

*Primary Examiner* — Douglas W Owens
*Assistant Examiner* — Wei Chan
(74) *Attorney, Agent, or Firm* — Viering, Jentschura & Partner mbB (57) ABSTRACT

Various embodiments may relate to a fault detection device for streetlamp lighting system. The streetlamp lighting system includes multiple load groups which are powered by a power cable. The fault detection device includes a master detection control unit and load detection control units configured for respective load groups, wherein the master detection control unit determines, according to a first fault feedback signal provided by respective load detection control unit, whether the load group corresponding to the load detection control unit is failed, while the streetlamp lighting system is in a first state, and the master detection control unit determines, according to a physical quantity detected on the power cable, whether the power cable is failed, while the streetlamp lighting system is in a second state. In addition, various embodiments further relate to a method of controlling the fault detection device.

20 Claims, 12 Drawing Sheets

(51) Int. Cl.
 *H05B 39/06* (2006.01)
 *H05B 35/00* (2006.01)
(58) Field of Classification Search
 CPC  H05B 33/0815; H05B 35/00; H05B 37/0281; H05B 37/03; F21V 13/04; F21V 21/116; F21V 23/026
 USPC ............ 340/825.08; 315/119, 127, 292, 316, 315/312, 324
 See application file for complete search history.

(56) References Cited

U.S. PATENT DOCUMENTS

| | | | | |
|---|---|---|---|---|
| 2006/0082222 | A1* | 4/2006 | Pincu | H02J 1/102 307/29 |
| 2009/0055031 | A1* | 2/2009 | Slota | H02J 3/42 700/287 |
| 2009/0303703 | A1* | 12/2009 | Kao | F21S 8/086 362/183 |
| 2010/0328849 | A1* | 12/2010 | Ewing | G06F 1/266 361/622 |
| 2011/0187271 | A1* | 8/2011 | Bouws | H05B 37/00 315/130 |
| 2012/0306382 | A1* | 12/2012 | Maxik | F21S 2/00 315/152 |
| 2014/0139117 | A1* | 5/2014 | Choe | H02J 9/00 315/153 |
| 2014/0139118 | A1* | 5/2014 | So | H05B 37/0263 315/153 |

OTHER PUBLICATIONS

International Search Report based on application No. PCT/EP2014/066085 (3 pages) dated Oct. 23, 2014 (for reference purpose only).

* cited by examiner

FAULT DETECTION DEVICE FOR STREETLAMP LIGHTING SYSTEM AND METHOD OF OPERATING THE SAME

RELATED APPLICATIONS

The present application is a national stage entry according to 35 U.S.C. §371 of PCT application No.: PCT/EP2014/066085 filed on Jul. 25, 2014, which claims priority from Chinese application No.: 201310332023.8 filed on Aug. 1, 2013, and is incorporated herein by reference in its entirety.

TECHNICAL FIELD

Various embodiments relate to a fault detection device for streetlamp lighting system and a method of operating the same

BACKGROUND

The streetlamp lighting system is widely used in different streets, and provides an effective lighting effect at night for the road or a particular region. Due to the universality of the streetlamp lighting system, lots of electric connecting lines are needed, and most of the electric lines have many security problems as they are unattended, for instance, the power cable of the lighting system may be subject to steeling or destroying, which causes most of the lighting devices incapable of running normally and appropriate lighting cannot be obtained on the road at night.

It is provided in one prior solution that detection of cable fault is realized by calculating the impedance value of the cable line, wherein the power line carrier measure is used to complete the process, and high-value power impedance devices paralleled with each lighting device are used during the process.

It is provided in another prior solution that a fault position is determined by measuring a return-voltage and resonant frequency with a dedicated theft-proof measurement instrument and a capacitor, wherein a variable-frequency and constant-amplitude AC current source is used in the fault detection.

SUMMARY

According to various embodiments, a novel fault detection device for streetlamp lighting system is proposed, which fault detection device can detect the cable fault using an AC power supply or a DC power supply, and finally can realize location of the fault position of the lighting system.

Various embodiments provide a fault detection device for streetlamp lighting system, wherein the streetlamp lighting system includes multiple load groups which are powered by a power cable, wherein the fault detection device includes a master detection control unit and load detection control units configured for respective load groups, wherein the master detection control unit determines, according to a first fault feedback signal provided by respective load detection control unit, whether the load group corresponding to the load detection control unit is failed, while the streetlamp lighting system is in a first state; and the master detection control unit determines, according to a physical quantity detected on the power cable, whether the power cable is failed, while the streetlamp lighting system is in a second state. Since the master detection control unit makes the fault detection for the lighting system according to different modes in different states, the possibility of automatically controlled fault monitor adapted to different application circumstances is provided. Besides, electrical isolation between different functional units is also realized so as to ensure stable operation of the fault detection device.

According to various embodiments, the first state is a DC power supply state of the power cable, and the second state is an AC power supply state of the power cable. In accordance with such configuration, in the DC power supply state, the fault detection device can simply detect the fault via the DC current loop, and in the AC power supply state, the total power change of the power cable can be monitored using the master detection control unit so that the fault detection device can always run normally in different power supply forms such that the fault detection can be finally performed successfully.

In various embodiments, the streetlamp lighting system determines that ambience enters a first environmental state according to the first state, and determines that ambience enters a second environmental state according to the second state. The fault detection device makes voluntary modification according to different application circumstances, realizes normal operation, and ensures successful fault detection of the lighting system.

In various embodiments, the first environmental state is daytime and the second environmental state is nighttime. Thus, the fault detection device can voluntarily monitor the lighting system in real time during 24 hours all day long when the worksite is unattended.

In various embodiments, the master detection control unit sends the first fault detection signal to each of the load detection control unit in sequence in the first state so as to obtain respective first fault feedback signals provided by the load detection control units. According to the feedback signals of the load detection control units, the master detection control unit can realize the signal recognition and determine the signal sources so as to achieve the possibility of determining and locating the fault.

In various embodiments, the physical quantity is a total power detected on the power cable. Upon obtaining the total power of the power cable, the overall state of all lighting devices in normal operation state is finally determined and evaluated in real time.

In various embodiments, the master detection control unit compares a current total power with a historical power value of the power cable in the second state so as to determine an amount of the load groups which are failed. Thus, evaluation of the overall situation of all lighting devices in normal operation state in the first state can be obtained.

In various embodiments, a DC current loop is formed between the master detection control unit and the load detection control units in the first state. Consequently, it is realized that in the first state the fault detection device implements simple communication between the master detection control unit and the load detection control units using the DC current loop, so as to realize the possibility of fault detection in a different mode in a situation different from the second state, and the DC power supply can be used.

In various embodiments, respective load detection control unit includes: a first voltage detection unit configured to detect a voltage of the power cable so as to provide a first state detection signal reflecting the first state or second state. According to the first state detection signal, the load detection control unit can realize modification of the fault detection mode so as to accomplish the possibility of fault detection in different forms and ensure the normal fault detection.

In various embodiments, respective load detection control unit further includes: a first control unit which is configured to receive the first state detection signal and the first fault detection signal, and generate the first fault feedback signal when a pattern included in the first fault detection signal is consistent with a pattern provided by the first control unit; an isolated receiver which receives the first fault detection signal from the master detection control unit and is activated by the first fault detection signal; and an isolated transmitter configured to transmit the first fault feedback signal to the master detection control unit. According to such configuration, the possibility of forming a DC communication loop between the load detection control units and the master detection control unit can be realized, and the communication is made with the help of the DC power supply so as to finally realize the possibility of fault detection in a situation different from the AC power supply situation.

In various embodiments, the isolated receivers or the isolated transmitters of respective load detection control units are separated from each other with optocouplers. In this way, electrical isolation between different functional units can be realized so as to finally guarantee the capability of independent and stable normal operation of respective units.

In various embodiments, respective load detection control unit further includes: a first electric energy storage configured to supply power to the first control unit and the isolated receiver; and a first charging unit which is configured to charge the first electric energy storage in an AC power supply state of the power cable. Thus, it can be realized that the power is supplied with a DC power supply in the absence of an AC power supply, and it is possible to implement normal fault detection.

In various embodiments, the master detection control unit includes: a second voltage detection unit configured to detect a voltage of the power cable so as to provide a second state detection signal reflecting the first state or second state; and a first current detection unit configured to provide a current signal detecting a current of the power cable. Consequently, the master detection control unit can carryout the voltage detection independent of the load detection control units, so as to realize the possibility of independently obtaining the voltage state and make modification of the fault detection mode according to this state.

In various embodiments, the master detection control unit further includes: a second control unit which is configured to receive the second state detection signal and the current signal so as to determine a current power value of the power cable; and an isolated transceiver which sends the first fault detection signal to respective load detection control units and receives the first fault feedback signals from the load detection control units. According to different fault detection modes, the master detection control unit can determine the overall state of all lighting devices in normal operation by virtue of the current power value of the power cable.

In various embodiments, the master detection control unit further includes: a second electric energy storage configured to supply power to the second control unit and the isolated transceiver; a second charging unit which is configured to be charged in an AC power supply state of the power cable; and a DC power supply which is configured to provide DC power supply to the isolated transceiver. Therefore, the master detection control unit can realize the possibility of independently supplying the power, as well as the possibility of supplying the power with a DC power supply in the absence of the AC power supply and finally implementing the fault detection successfully.

In various embodiments, a voltage value of the DC power supply is set by the first control unit of respective load detection control unit and the second control unit of the master detection control unit to be lower than an AC voltage value in the AC power supply state. In this way, the first and second charging units of the master detection control unit and the load detection control units will not be falsely activated such that the normal fault detection is ensured.

In various embodiments, the DC current loop is comprised of the DC power supply and the isolated transceiver of the master detection control unit, and the isolated receivers and the isolated transmitters of respective load detection control units. According to such configuration, stable communication between respective isolated units can be ensured, so as to guarantee the reliability of the DC current loop, and use of costly equipment such as DC voltage divider also can be avoided.

Various embodiments further provide an operation method of a fault detection device for streetlamp lighting system including multiple load groups which are powered by a power cable, wherein the operation method includes the following steps: a) providing a load detection control unit configured to monitor corresponding load group, and a master detection control unit; b) determining whether the streetlamp lighting system is in a first state or a second state; c) the master detection control unit determining, according to a first fault feedback signal provided by the load detection control unit, whether the load group corresponding to the load detection control unit is failed, while the streetlamp lighting system is in the first state; and d) the master detection control unit determining, according to a physical quantity detected on the power cable, whether the power cable is failed, while the streetlamp lighting system is in the second state. According to such method, it can be realized that the lighting system can be successfully monitored in different fault detection modes in different environmental states so as to detect possible fault.

According to various embodiments, the step b) includes: b1) detecting a voltage of the power cable using a first voltage detection unit of respective load detection control unit so as to provide a first state detection signal reflecting the first state or second state to the load detection control unit; and b2) detecting a voltage of the power cable using a second voltage detection unit of the master detection control unit so as to provide a second state detection signal reflecting the first state or second state to the total load detection control unit. The load detection control units and the master detection control unit can independently detect the voltage so as to determine the environmental state and realize the final fault detection modification.

In various embodiments, the step c) includes: c1) the master detection control unit sending a first fault detection signal to respective load detection control units in sequence; c2) the load detection control unit generating a first fault feedback signal, when a pattern included in the first fault detection signal is consistent with a pattern of the corresponding load detection control unit, and sending the first fault feedback signal back to the master detection control unit, otherwise, no first fault feedback signal being generated; and c3) the master detection control unit, when confirming that the first fault feedback signal of the corresponding load detection control unit is not received, determining that the load group corresponding to the load detection control unit is the load group which is failed.

In various embodiments, the step d) includes: d1) using the first current detection unit and the second voltage detection unit in the master detection control unit to calculate and obtain a current total power of the power cable; d2) the master detection control unit comparing the current total power with a historical power value of the power cable; and d3) determining an amount of the load groups which are failed when a difference between the current total power and the historical power value of the power cable exceeds a predetermined value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
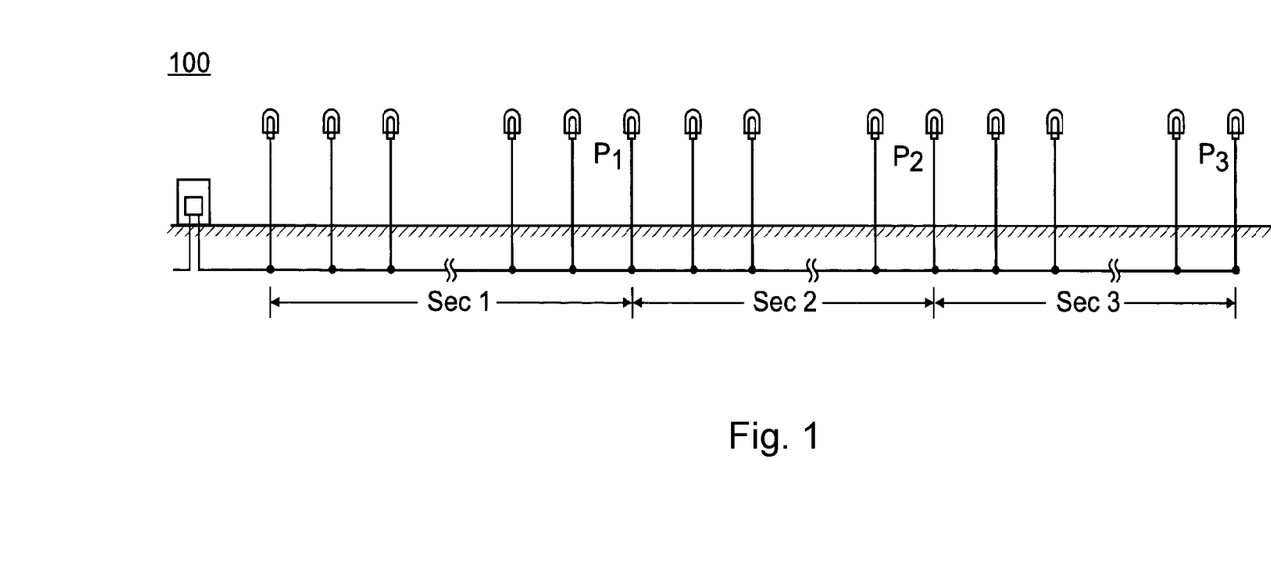
FIG. 1 is a schematic diagram of configuration of a power cable of a streetlamp lighting system according to the present disclosure.
Figure 2:
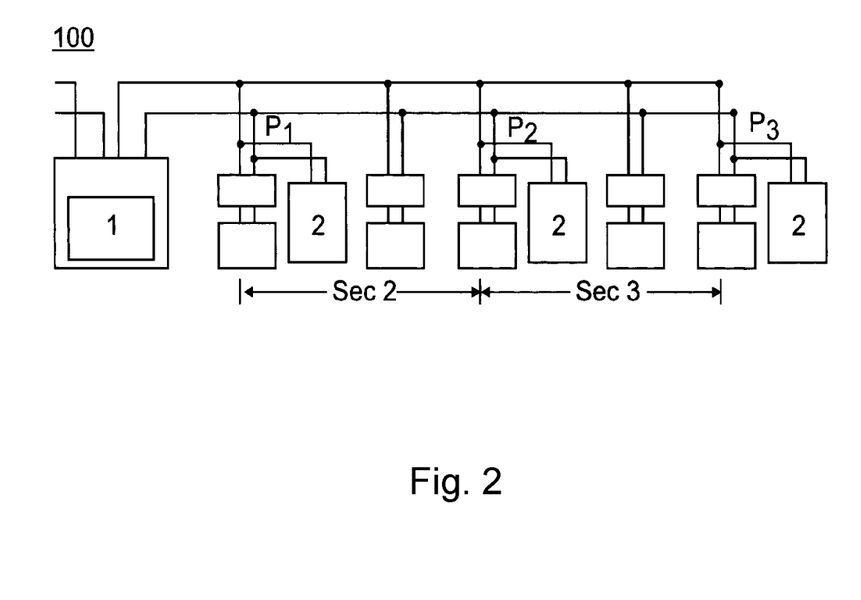
FIG. 2 is a schematic diagram of functional structure of a fault detection device of the streetlamp lighting system according to the present disclosure.

FIG. 1 is a schematic diagram of configuration of a power cable L of a streetlamp lighting system according to the present disclosure. As shown in FIG. 1, the streetlamp lighting system according to the present disclosure has multiple lighting devices electrically connected to the same power cable L, and one total control cabinet is provided at one end of these lighting devices to realize simultaneous automatic or manual electric control of the multiple lighting devices, wherein in order to realize a fault detection device 100 according to the present disclosure, these multiple lighting devices are functionally divided into several sections, for example, a first section Sec1, a second section Sect and a third section Sec3 as shown in FIG. 1, and the lighting devices are divided into multiple load groups P1, P2, and P3 according to these sections. Refer to FIG. 2, which shows a schematic diagram of functional structure of the fault detection device 100 of the streetlamp lighting system according to the present disclosure. By providing a load detection control unit 2 at least in the last lighting device in each section, i.e. providing the load detection control unit 2 in a lighting device farthest from the total control cabinet as shown in the circuit in each section, meanwhile, providing a master detection control unit 1 in the total control cabinet, all the lighting devices located between the master detection control unit 1 and the load detection control units 2 in the circuit can be taken as, for instance, a load group, to realize the fault detection and monitor. In the above, in the configuration as shown in FIG. 2, the load detection control units 2 can be electrically connected with drive means and a light source of the lighting devices independently in circuit so as to realize the effect of independent fault detection and monitor.

Figure 3:
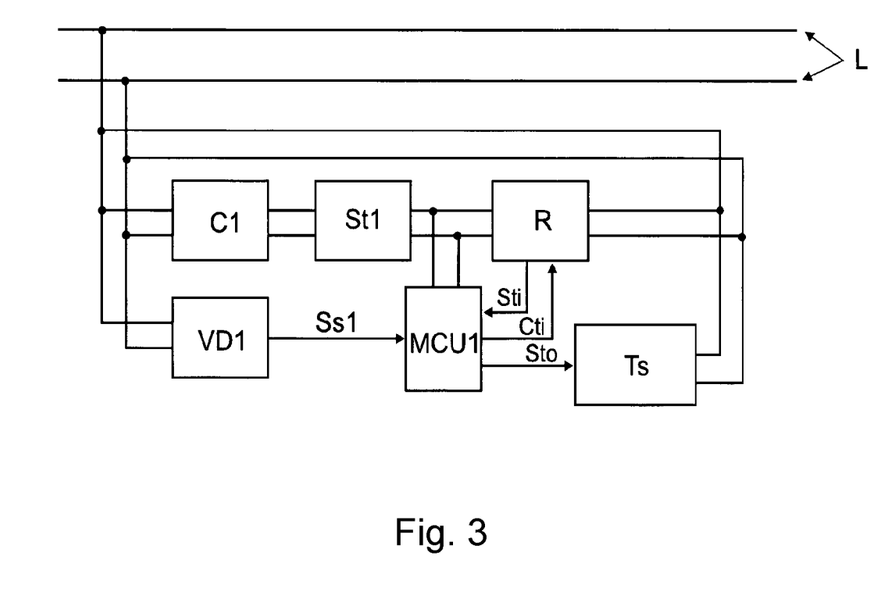
FIG. 3 is a schematic diagram of functional structure of a load detection control unit according to the present disclosure.
Figure 4:
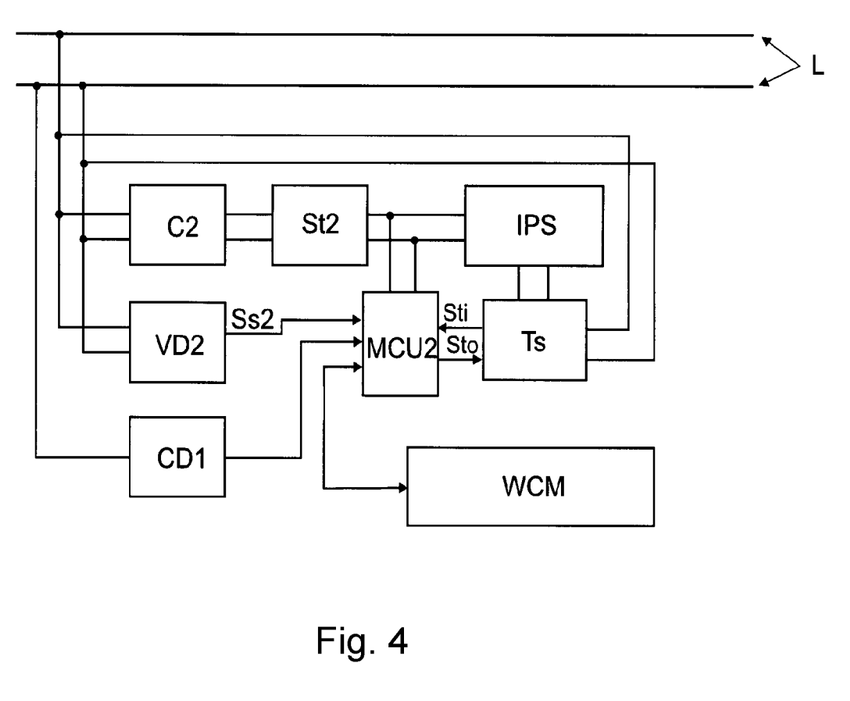
FIG. 4 is a schematic diagram of functional structure of a master detection control unit according to the present disclosure.

Refer to FIG. 3 and FIG. 4. FIG. 3 is a schematic diagram of functional structure of respective load detection control unit 2 according to the present disclosure, and FIG. 4 is a schematic diagram of functional structure of the master detection control unit 1 according to the present disclosure. As shown in FIG. 3 and FIG. 4, the load detection control unit 2 according to the present disclosure includes a first charging unit C1 configured to be connected with an AC power supply, a first electric energy storage St1 connected with and charged by the first charging unit C1, and an isolated receiver R and an isolated transmitter Tr connected individually with a first control unit MCU1, in addition, the load detection control unit 2 further includes a first voltage detection unit VD1 configured to detect a power cable voltage state. The first voltage detection unit VD1 sends to the first control unit MCU1 a first state detection signal Ss1 according to a detection result of the power cable voltage, so as to inform the first control unit MCU1 of a recognized environmental state of daytime or nighttime, and then, the load detection control unit 2 can modify the fault detection mode according the circumstance so as to ensure normal and stable operation of the whole fault detection device 100, wherein the first voltage detection unit VD1 can determine whether the lighting system is in a daytime or nighttime state by, for instance, detecting whether it is in an AC power supply state, that is, in a situation of the presence of the AC power supply, the lighting system can be recognized as in a nighttime state, and in a situation of absence of the AC power supply but presence of DC power supply, the lighting system can be recognized as in a daytime state. For example, in the daytime state, with the help of a DC power supply IPS in the load detection control unit 2, the first control unit MCU1 can send to the isolated receiver R a control signal Ct1, and receives via the isolated receiver R a first fault detection signal Sti from the master detection control unit 1, and upon processing of the signal, sends via the isolated transmitter Tr a first fault feedback signal Sto to the master detection control unit 1.

In order to implement interactive communication independently with the load detection control units 2, as shown in FIG. 4, the master detection control unit 1 is configured to include a second charging unit C2 in connection with the AC power supply, a second electric energy storage St2 connected with and charged by the second charging unit C2, and an isolated transceiver Ts connected independently with a second control unit MCU2, in addition, the master detection control unit 1 further includes a second voltage detection unit VD2 and a first current detection unit CD1. In order to implement communication between the master detection control unit 1 and, for example, a control center, so as to send an alarm to an operator, a wireless communication unit can be further provided in the master detection control unit 1. Similar to the first voltage detection unit VD1 in the load detection control unit 2, the second voltage detection unit VD2 provides a second state detection signal Ss2 to the second control unit MCU2 according to the detected voltage state, and informs the second control unit MCU2 of the recognized environmental state of the lighting system, e.g. daytime or nighttime, so as to realize modification of the fault detection mode, and, for example, in the daytime state, with the aid of the DC power supply IPS, the first fault detection signal Sti is sent via the isolated transceiver Ts to each of the load detection control units 2 in sequence to start the fault detection flow, and the first fault feedback signal Sto from the load detection control unit 2 which runs normally is received via the isolated transceiver Ts. Besides, for instance, in the nighttime state, by virtue of a current value of the power cable L obtained via the first current detection unit CD1, in combination with a voltage value of the power cable L obtained via the second voltage detection unit VD2, a total power value of the power cable L can be further obtained so as to finally determine the amount of the lighting devices which run normally and the overall operation state of the lighting system.

Figure 5:
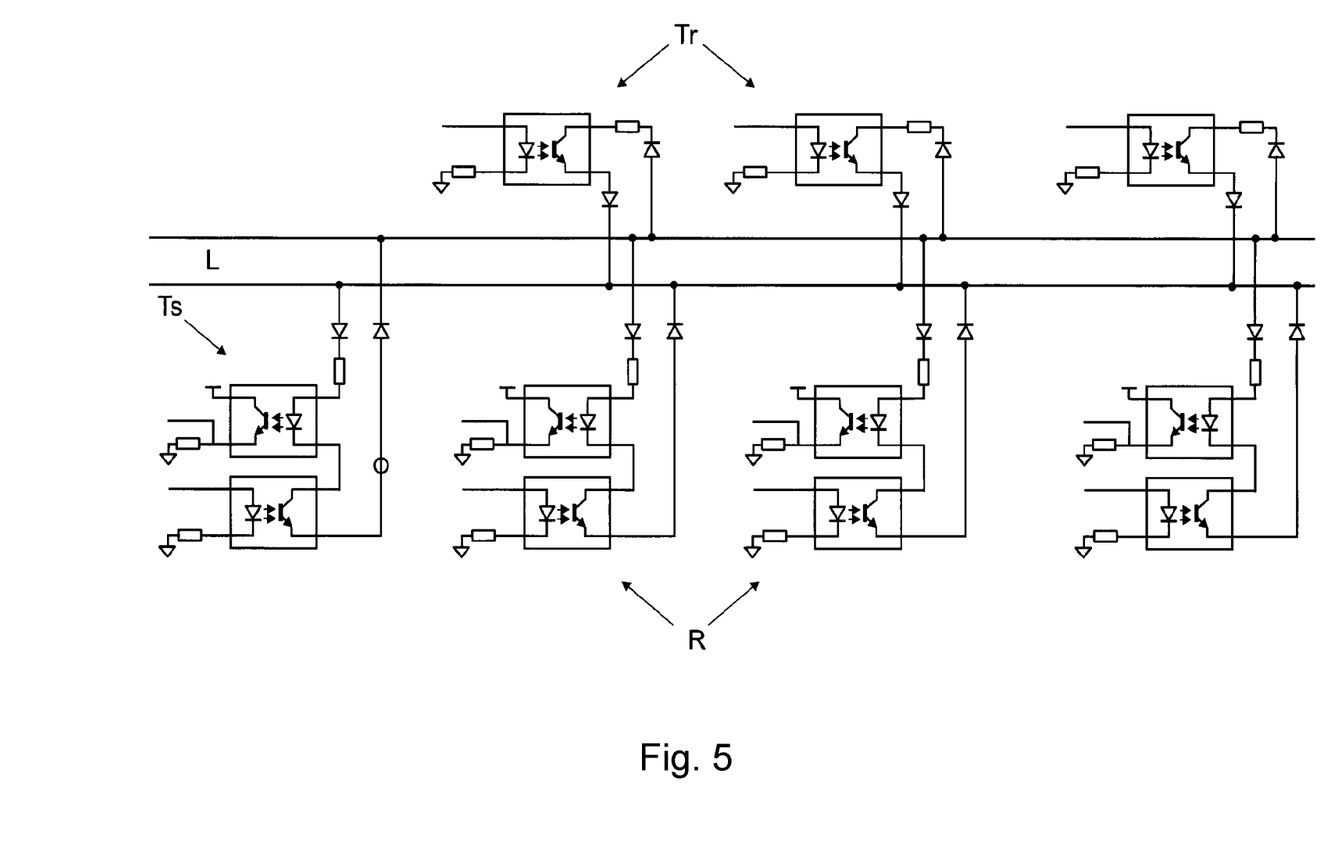
FIG. 5 is a structural schematic diagram of a DC current loop according to the present disclosure.

FIG. 5 is a structural schematic diagram of a DC current loop according to the present disclosure. As shown in FIG. 5, in accordance with the solution of the present disclosure, a DC current loop can be formed between the load detection control units 2 and the master detection control unit 1, so as to ensure, for instance, in the daytime state, that the master detection control unit 1 can normally communicate with each load detection control unit 2 in a situation that only a DC power supply supplies the power. In the above, the DC current loop is comprised of the DC power supply and the isolated transceiver Ts of the master detection control unit 1, and the isolated receivers R and the isolated transmitters Tr of respective load detection control units 2, and an optocoupler, for instance, can be provided between the master detection control unit 1 and each load detection control unit 2, so as to realize electrical isolation between respective different units and ensure the normal and stable operation of the DC current loop. According to such configuration, the first fault detection signal Sti from the master detection control unit 1 can be sent out and transmitted in the DC current loop, and upon receipt by the isolated receiver R of the corresponding load detection control unit 2, if the operation is normal, the first fault feedback signal Sto is again sent via the isolated transmitter Tr on this DC current loop so as to complete communication interaction between the load detection control unit 2 and the master detection control unit 1.

Figure 6:
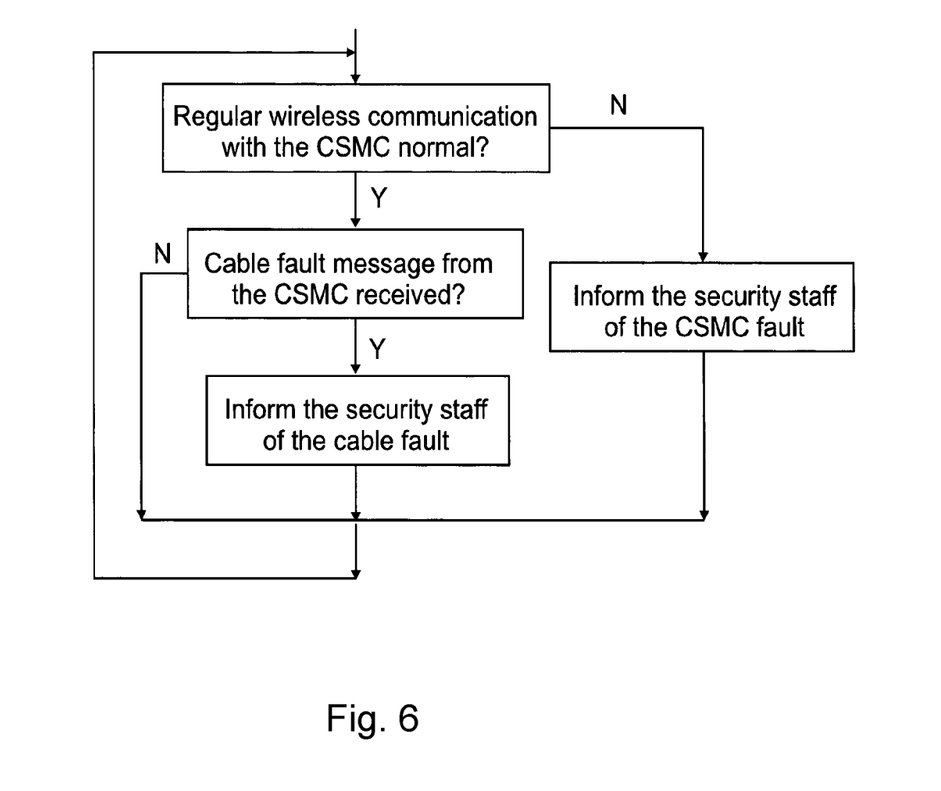
FIG. 6 is a schematic diagram of control flow of a control center according to the present disclosure.

FIG. 6 is a schematic diagram of control flow of the control center according to the present disclosure. In accordance with this configuration, the control center can warn the operator or monitor according the detection of the master detection control unit 1, for instance, a fault message from the master detection control unit 1 is received via wireless communication, and then, an alarm is sent to the operator so as to finally achieve the function of, for example, anti-theft or warning.

Figure 7:
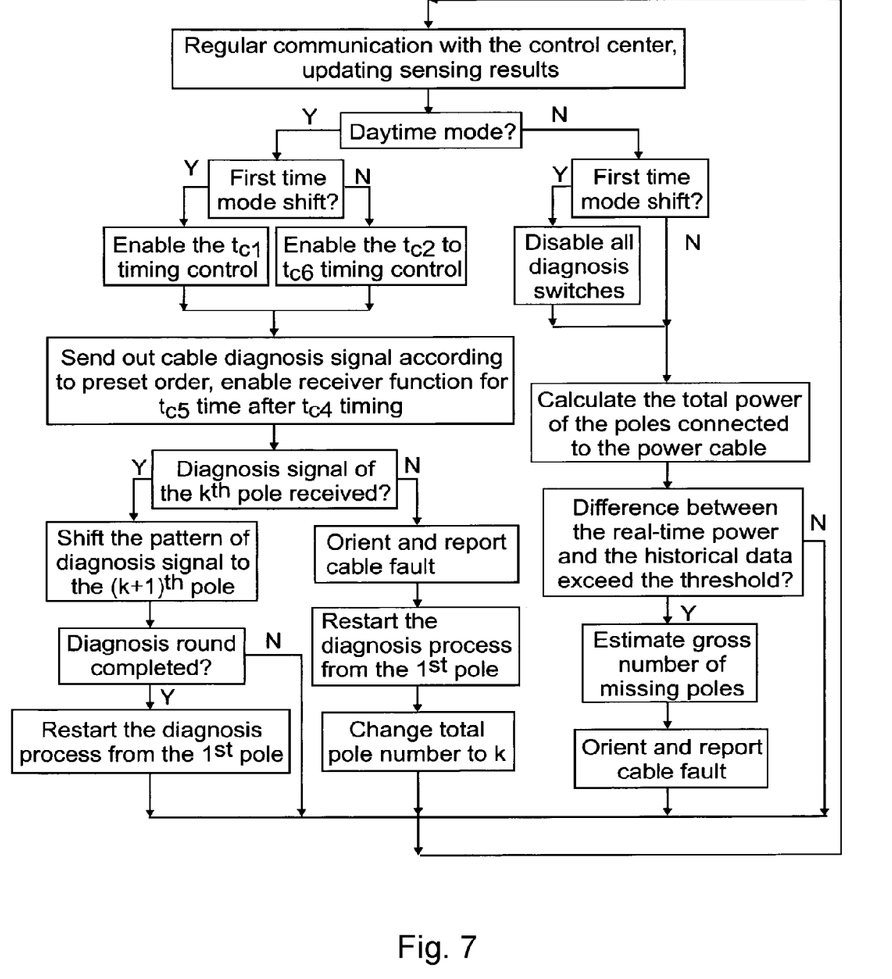
FIG. 7 is a schematic diagram of control flow of the master detection control unit according to the present disclosure.
Figure 9:
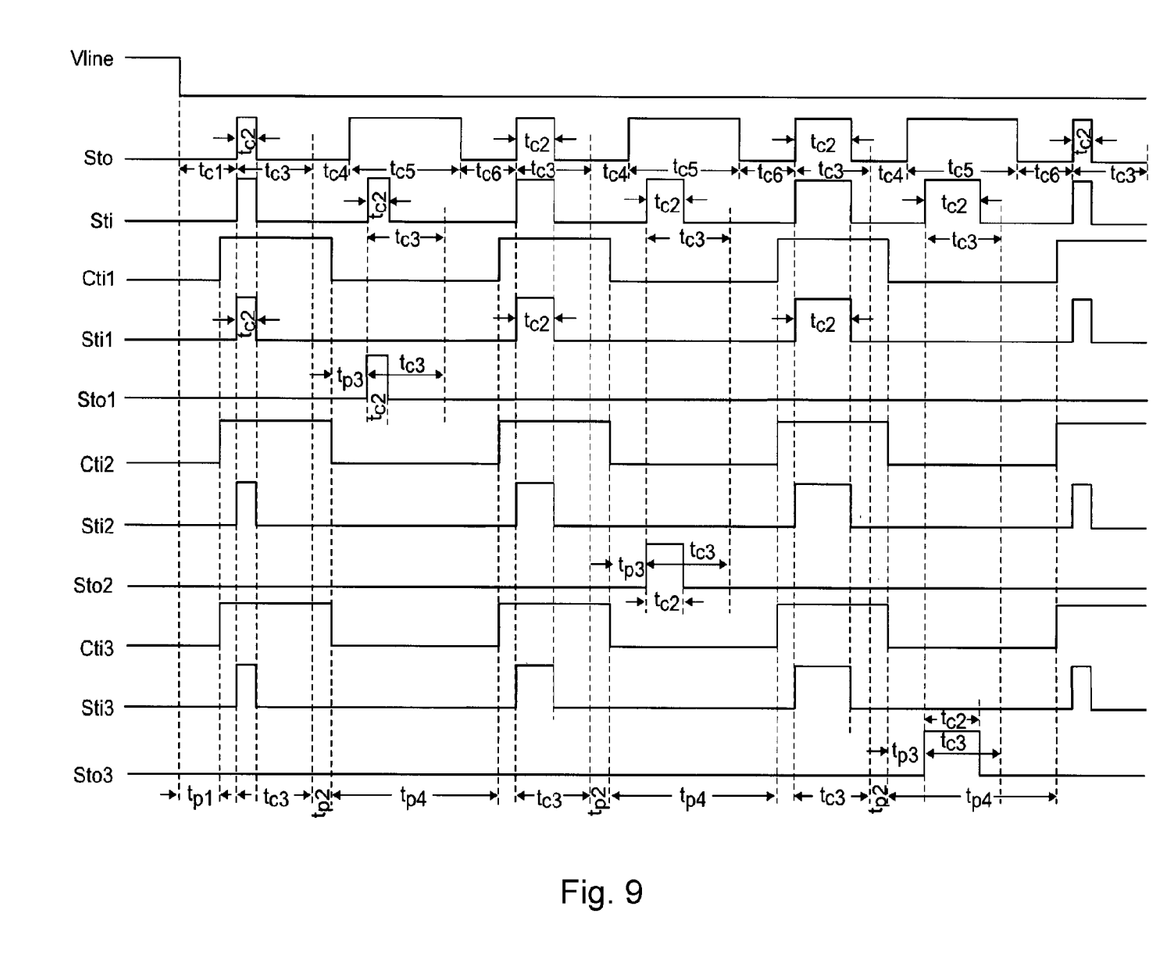
FIG. 9 is a signal timing diagram in a fault detection mode during the shift from the nighttime to daytime according to the present disclosure.
Figure 10:
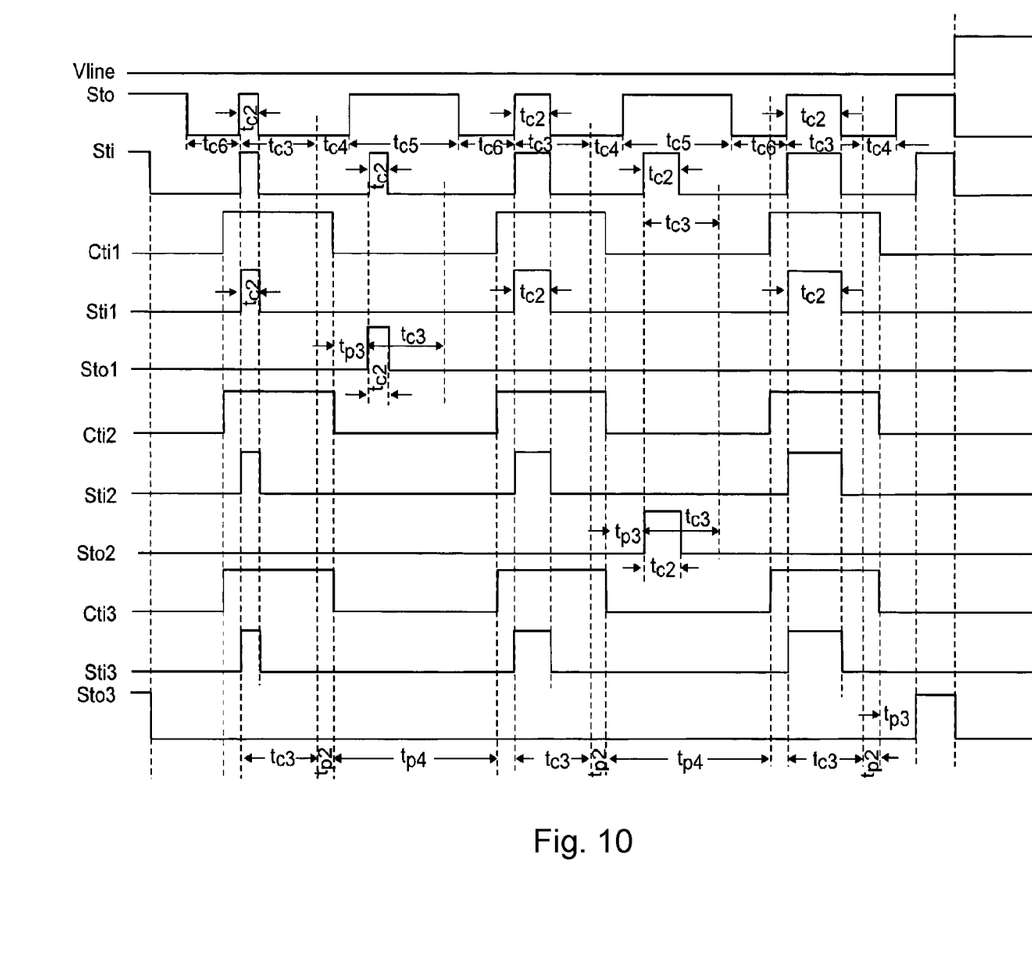
FIG. 10 is a signal timing diagram in a fault detection mode during the shift from the daytime to nighttime according to the present disclosure.

FIG. 7 is a schematic diagram of control flow of the master detection control unit 1 according to the present disclosure. As shown in FIG. 7, different fault detection flows are generated according to a daytime or nighttime state after the second voltage detection unit VD2 recognizes whether the lighting system is in the daytime or nighttime environmental state. In the daytime environmental state, for instance, the master detection control unit 1 starts to send the first fault detection signal Sti to each of the load detection control units 2 in a predetermined order. In the above, refer to FIG. 9 and FIG. 10. FIG. 9 is a signal timing diagram in a fault detection mode during the shift from the nighttime to daytime according to the present disclosure; and FIG. 10 is a signal timing diagram in a fault detection mode during the shift from the daytime to nighttime according to the present disclosure, wherein FIG. 9 and FIG. 10 respectively show the timing diagram of the first fault detection signal Sti and the first fault feedback signals Sto in the master detection control unit 1, and the timing diagrams of the first fault detection signals Sti1, Sti2 and Sti3, the first fault feedback signals Sto1, Sto2 and Sto3 of the load detection control units 2 of the first load group P1, the second load group P2, and the third load group P3, and the control signals Cti1, Cti2 and Cti3 of the second control unit MCU2. On the basis that the fault detection device 100 is subject for the first time to the state shift from the nighttime to daytime, timing control started from tc1 is implemented, the first electric energy storage St1, after charged by the first charging unit C1, supplies independently a DC power supply to the master detection control unit 1; when the fault detection device 100 is not subject for the first time to the state shift from the nighttime to daytime, the timing control from tc2 to tc6 is implemented, the master detection control unit 1 can obtain the electric power directly from the first electric energy storage St1 which has been charged, so as to carry out the fault detection with the aid of the DC current loop. After the first fault detection signal Sti is sent, the signal is received via the isolated transceiver Ts at the tc4 timing, and keeps for a tc5 timing period, if the first fault feedback signal Sto from the load detection control unit 2 corresponding to the first fault detection signal Sti is received, the master detection control unit 1 changes a pattern included in the first fault detection signal Sti into a pattern corresponding to the next load detection control unit 2 to be detected, and sends out the first fault detection signal Sti; moreover, when the first fault feedback signal Sto from the load detection control unit 2 corresponding to the first fault detection signal Sti is not received, it is determined that a fault occurs, the specific situation, e.g. serial number, of the load detection control unit 2 which fails to feed back is determined according to the pattern corresponding to the first fault detection signal Sti which is not fed back, so as to start locating and report to the control center the fault situation, meanwhile, the fault detection process is started again from the first load detection control unit 2, and the amount of the lighting devices which run normally is finally determined.

It is also shown in FIG. 7 that, for instance, when a nighttime state is detected according to the second voltage detection unit VD2, similarly, it is determined whether the fault detection device 100 is subject for the first time to, the state shift form the daytime to nighttime, if yes, all fault detection switches are stopped, and it starts to calculate the total power of the power cable L, or if not, it directly starts to calculate the total power of the power cable L to compare it with a historical power value. When a difference between the current total power value and the historical power value exceeds a predetermined value, it starts to evaluate the total number of the disconnected lighting devices, and the fault is further located according to the total number, and is reported to the control center, wherein, for instance, when the total number of the disconnected lighting devices is evaluated to be three, it can be determined that the location where the fault occurs on the circuit is the third lighting device from the last on the power cable L; and when the difference does not exceed the predetermined value, the master detection control unit 1 makes conventional communication with the control center so as to update the detection data.

Figure 8:
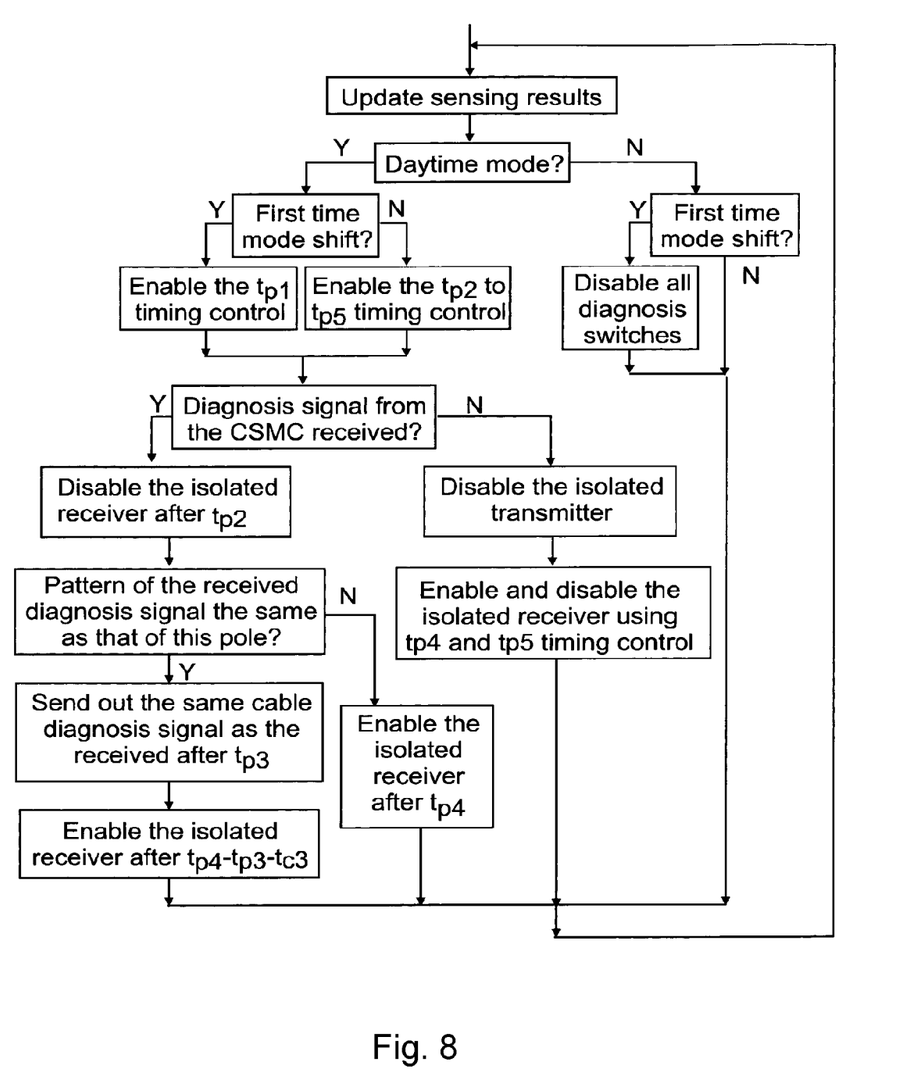
FIG. 8 is a schematic diagram of control flow of the load detection control unit according to the present disclosure.
Figure 11:
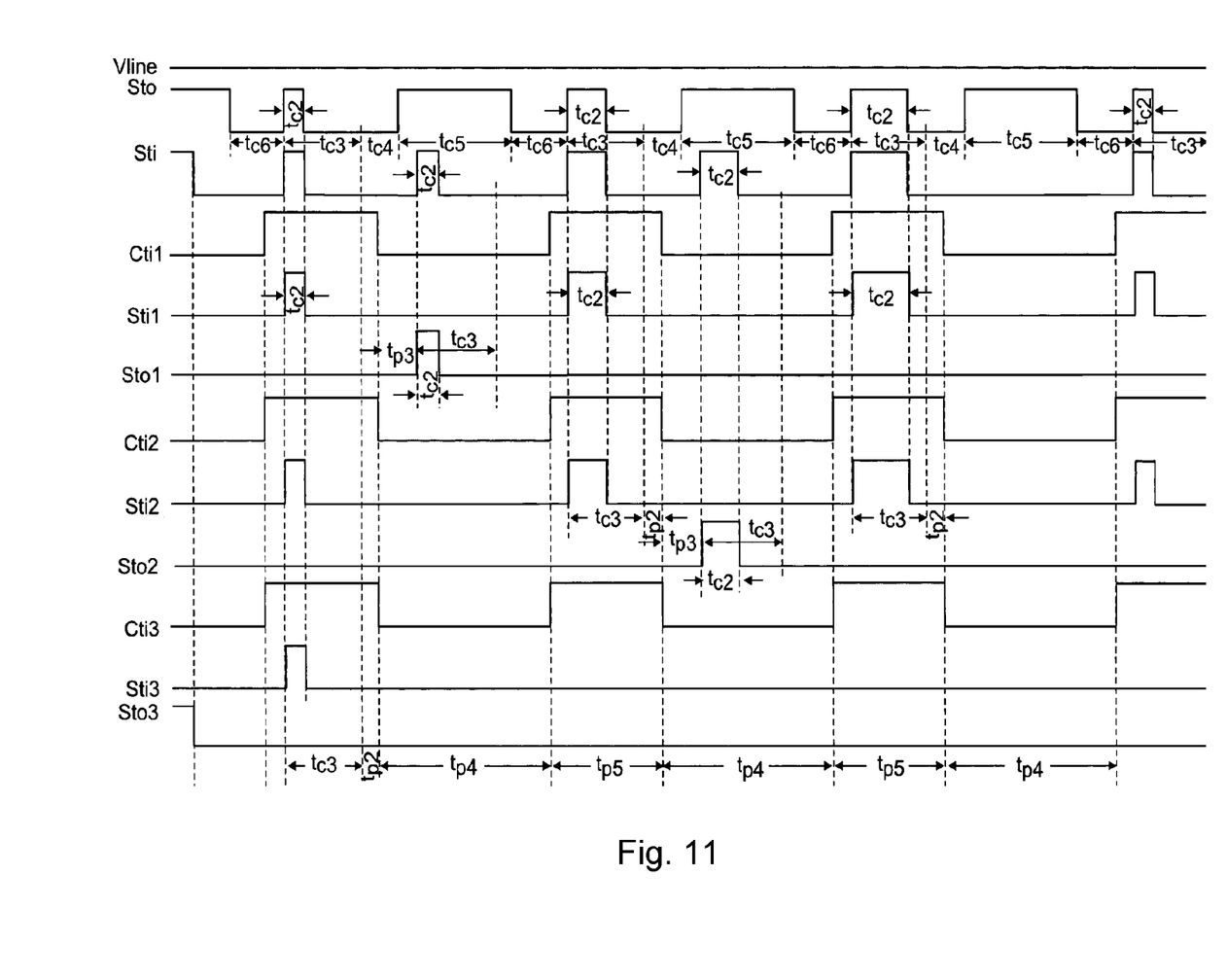
FIG. 11 is a signal timing diagram in the fault detection at the daytime.

FIG. 8 is a schematic diagram of control flow of the load detection control unit 2 according to the present disclosure. As shown in FIG. 8, corresponding to the fault detection flow of the master detection control unit 1, when the load detection control unit 2 recognizes the circumstance as the daytime, according to the situation whether the fault detection device 100 is subject for the first time to the state shift from the nighttime to daytime, the load detection control unit 2 determines, via the isolated receiver R, whether the first fault detection signal Sti from the master detection control unit 1 is received. In the above, refer to FIG. 9 and FIG. 10, when the fault detection device 100 is subject for the first time to the state shift from the nighttime to daytime, the timing control from the tp1 is implemented, otherwise, the timing control from tp2 to tp5 is implemented. When it is confirmed that the isolated receiver R receives the first fault detection signal Sti, the isolated receiver R is stopped for a period of time, and it starts to recognize whether the pattern of the first fault detection signal Sti is consistent with the pattern corresponding to the lighting device. If yes, after tp3, the load detection control unit 2 sends, via the isolated transmitter Tr, to the master detection control unit 1 the first fault feedback signal Sto, and after the tp4-tp3-tc3 timing, the isolated receiver R is restarted; if not, the isolated receiver R is re-activated after the tp4 timing. Refer to FIG. 11, which shows a signal timing diagram in the fault detection at the daytime according to the present disclosure. When the isolated receiver R does not receive the first fault detection signal Sti, operation of the isolated transmitter Tr is stopped, and the isolated receiver R is enabled and disabled at the tp4 and tp5 timing so as to detect whether the first fault detection signal Sti can be received, and thereafter, the monitor data is updated.

Figure 12:
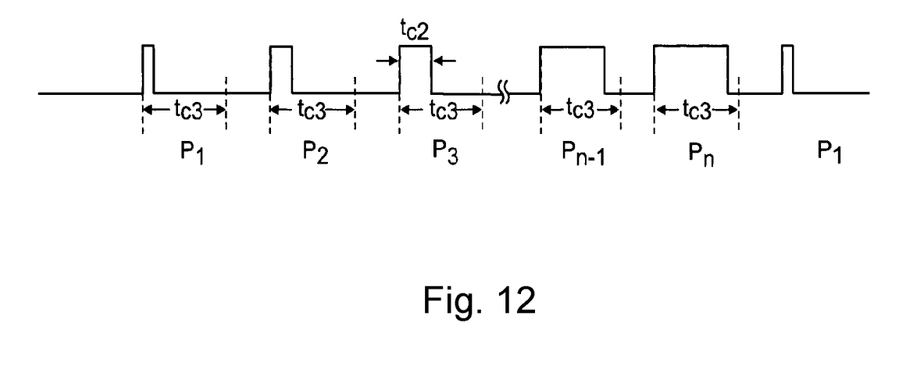
FIG. 12 is a schematic diagram of first fault detection signals sent to different load detection control units according to the present disclosure.

FIG. 12 is a schematic diagram of first fault detection signals sent to different load detection control units 2 according to the present disclosure. According to the solution of the present disclosure, the first fault detection signals Sti corresponding to respective the load detection control units 2 can be configured different from each other, and have different or particular patterns, for instance, viewed in the timing, the first fault detection signals Sti corresponding to respective load detection control units 2 can be configured with different timing lengths, that is, the timing length corresponding to the first load group P1 can be less than the timing length corresponding to the second load group P2, and the timing length corresponding to the second load group P2 can be less than the timing length corresponding to the third load group P3.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:
1. A fault detection device for a streetlamp lighting system comprising multiple load groups which are powered by a power cable, the fault detection device comprising:
a master detection control unit and
multiple load detection control units configured for respective load groups,
wherein the master detection control unit determines, according to a first fault feedback signal provided by respective load detection control unit, whether the load group corresponding to the load detection control unit is failed, while the streetlamp lighting system is in a first state, wherein the first state is a DC power supply state of the power cable;
and the master detection control unit determines, according to a physical quantity detected on the power cable, whether the power cable is failed, while the streetlamp lighting system is in a second state, wherein the second state is an AC power supply state of the power cable.
2. The fault detection device according to claim 1, wherein the streetlamp lighting system determines that ambience enters a first environmental state according to the first state, and determines that ambience enters a second environmental state according to the second state.
3. The fault detection device according to claim 2, wherein the first environmental state is daytime and the second environmental state is nighttime.
4. The fault detection device according to claim 1, wherein the master detection control unit sends the first fault detection signal to each of the load detection control unit in sequence in the first state so as to obtain respective first fault feedback signals provided by the load detection control units.
5. The fault detection device according to claim 1, wherein the physical quantity is a total power detected on the power cable.
6. The fault detection device according to claim 5, wherein the master detection control unit compares a current total power with a historical power value of the power cable in the second state so as to determine an amount of the load groups which are failed.
7. The fault detection device according to claim 1, wherein a DC current loop is formed between the master detection control unit and the load detection control units in the first state.
8. The fault detection device according to claim 1, wherein the respective load detection control unit comprises: a first voltage detection unit configured to detect a voltage of the power cable so as to provide a first state detection signal reflecting the first state or second state.
9. The fault detection device according to claim 8, wherein the respective load detection control unit further comprises: a first control unit which is configured to receive the first state detection signal and the first fault detection signal, and generate the first fault feedback signal when a pattern included in the first fault detection signal is consistent with a pattern provided by the first control unit; an isolated receiver which receives the first fault detection signal from the master detection control unit and is activated by the first fault detection signal; and an isolated transmitter configured to transmit the first fault feedback signal to the master detection control unit.
10. The fault detection device according to claim 9, wherein the isolated receivers or the isolated transmitters of respective load detection control units are separated from each other with optocouplers.
11. The fault detection device according to claim 9, wherein the respective load detection control unit further comprises: a first electric energy storage configured to supply power to the first control unit and the isolated receiver; and a first charging unit which is configured to charge the first electric energy storage in an AC power supply state of the power cable.

12. The fault detection device according to claim 1, wherein the master detection control unit comprises: a second voltage detection unit configured to detect a voltage of the power cable so as to provide a second state detection signal reflecting the first state or second state; and a first current detection unit configured to provide a current signal detecting a current of the power cable.

13. The fault detection device according to claim 12, wherein the master detection control unit further comprises: a second control unit which is configured to receive the second state detection signal and the current signal so as to determine a current power value of the power cable; and an isolated transceiver which sends the first fault detection signal to respective load detection control units and receives the first fault feedback signals from the load detection control units.

14. The fault detection device according to claim 13, wherein the master detection control unit further comprises: a second electric energy storage configured to supply power to the second control unit and the isolated transceiver; a second charging unit which is configured to be charged in an AC power supply state of the power cable; and a DC power supply which is configured to provide DC power supply to the isolated transceiver.

15. The fault detection device according to claim 14, wherein a voltage value of the DC power supply is set by a first control unit of respective load detection control unit and the second control unit of the master detection control unit to be lower than an AC voltage value in the AC power supply state.

16. The fault detection device according to claim 7, wherein the DC current loop is comprised of the DC power supply and the isolated transceiver of the master detection control unit, and the isolated receivers and the isolated transmitters of respective load detection control units.

17. An operation method of a fault detection device for a streetlamp lighting system comprising multiple load groups which are powered by a power cable, the method comprising:
   a) providing a load detection control unit configured to monitor corresponding load group, and a master detection control unit;
   b) determining whether the streetlamp lighting system is in a first state with a DC power supply state of the power cable or a second state with an AC power supply state of the power cable;
   c) the master detection control unit determining, according to a first fault feedback signal provided by the load detection control unit, whether the load group corresponding to the load detection control unit is failed, while the streetlamp lighting system is in the first state; and
   d) the master detection control unit determining, according to a physical quantity detected on the power cable, whether the power cable is failed, while the streetlamp lighting system is in the second state.

18. The method according to claim 17, wherein b) comprises:
   b1) detecting a voltage of the power cable using a first voltage detection unit of respective load detection control unit so as to provide a first state detection signal reflecting the first state or second state to the load detection control unit; and
   b2) detecting a voltage of the power cable using a second voltage detection unit of the master detection control unit so as to provide a second state detection signal reflecting the first state or second state to the total load detection control unit.

19. The method according to claim 18, wherein c) comprises:
   c1) the master detection control unit sending a first fault detection signal to respective load detection control unit in sequence;
   c2) the load detection control unit generating a first fault feedback signal, when a pattern included in the first fault detection signal is consistent with a pattern of the corresponding load detection control unit, and sending the first fault feedback signal back to the master detection control unit, otherwise, no first fault feedback signal being generated; and
   c3) the master detection control unit, when confirming that the first fault feedback signal of the corresponding load detection control unit is not received, determining that the load group corresponding to the corresponding load detection control unit is the load group which is failed.

20. The method according to claim 18, wherein d) comprises:
   d1) using a first current detection unit and the second voltage detection unit in the master detection control unit to calculate and obtain a current total power of the power cable;
   d2) the master detection control unit comparing the current total power with a historical power value of the power cable; and
   d3) determining an amount of the load groups which are failed when a difference between the current total power and the historical power value of the power cable exceeds a predetermined value.

* * * * *